(12) United States Patent
Post et al.

(10) Patent No.: US 11,873,836 B2
(45) Date of Patent: Jan. 16, 2024

(54) BLOWER ASSEMBLY FOR GAS-BURNING APPLIANCE

(71) Applicant: REGAL BELOIT AMERICA, INC., Beloit, WI (US)

(72) Inventors: Steven W. Post, Centerton, AR (US); Michael D. Smith, Rogers, AR (US)

(73) Assignee: Regal Beloit America, Inc., Beloit, WI (US)

( * ) Notice: Subject to any disclaimer, the term of this patent is extended or adjusted under 35 U.S.C. 154(b) by 920 days.

(21) Appl. No.: 16/808,799

(22) Filed: Mar. 4, 2020

(65) Prior Publication Data

US 2020/0284429 A1 Sep. 10, 2020

Related U.S. Application Data

(60) Provisional application No. 62/813,394, filed on Mar. 4, 2019.

(51) Int. Cl.
*F04D 29/42* (2006.01)
*F23D 14/66* (2006.01)
(Continued)

(52) U.S. Cl.
CPC ....... *F04D 29/4206* (2013.01); *F04D 29/083* (2013.01); *F04D 29/4213* (2013.01); *F04D 29/624* (2013.01); *F23D 14/66* (2013.01); *F23L 17/005* (2013.01); *F24H 1/205* (2013.01); *F04D 17/16* (2013.01); *F04D 25/166* (2013.01); *F04D 29/4226* (2013.01); *F04D 29/5806* (2013.01); *F23D 14/34* (2013.01); *F23L 5/02* (2013.01); *F23N 2239/04* (2020.01); *F23N 2241/04* (2020.01); *Y02E 20/34* (2013.01)

(58) Field of Classification Search
CPC ........ F23D 14/34; F23D 14/66; F04D 29/083; F04D 29/4206; F04D 29/624; F04D 17/16; F04D 25/166; F04D 29/4213; F04D 29/4226; F04D 29/5806; F24H 1/205; Y02E 20/34; F23N 2239/04; F23L 5/02; F23L 17/005
USPC ...................................................... 122/18.31
See application file for complete search history.

(56) References Cited

U.S. PATENT DOCUMENTS

5,062,788 A  11/1991 Best
6,109,339 A  8/2000 Talbert et al.
(Continued)

*Primary Examiner* — Steven B McAllister
*Assistant Examiner* — Benjamin W Johnson
(74) *Attorney, Agent, or Firm* — Armstrong Teasdale LLP (57) ABSTRACT

A blower assembly for a gas-burning appliance includes a blower and a motor coupled to the blower and configured to turn the blower to provide airflow through the gas-burning appliance. The blower assembly also includes a housing enclosing the blower and the motor. The housing includes a first portion and a second portion coupled to the first portion. The first portion and the second portion define a cavity therebetween to receive the motor and the blower. The blower assembly further includes an inlet sleeve coupled between the first portion and the second portion. The inlet sleeve is configured to couple to the gas-burning appliance and receive the airflow from the gas-burning appliance. The blower assembly also includes a seal extending at least partially around the inlet sleeve and at least partially between the inlet sleeve and at least one of the first portion and the second portion.

18 Claims, 6 Drawing Sheets

(51) Int. Cl.
*F04D 29/62* (2006.01)
*F24H 1/20* (2022.01)
*F04D 29/08* (2006.01)
*F23L 17/00* (2006.01)
*F23D 14/34* (2006.01)
*F04D 17/16* (2006.01)
*F04D 25/16* (2006.01)
*F04D 29/58* (2006.01)
*F23L 5/02* (2006.01)

(56) References Cited

U.S. PATENT DOCUMENTS

| | | |
|---|---|---|
| 6,578,570 B2 | 6/2003 | Fogliani et al. |
| 7,144,651 B2 | 12/2006 | Finn et al. |
| 7,354,244 B2 * | 4/2008 | Hasbargen ............ F23L 17/005 |
| | | 415/212.1 |
| 7,836,877 B2 | 11/2010 | Gagas et al. |
| 8,872,077 B2 | 10/2014 | Gagas et al. |
| 10,266,984 B1 | 4/2019 | Brown |
| 2004/0258546 A1 * | 12/2004 | Gatley, Jr. ............... F04D 25/06 |
| | | 417/439 |
| 2012/0180737 A1 * | 7/2012 | English ................. F24H 9/0031 |
| | | 122/18.31 |
| 2016/0327263 A1 | 11/2016 | Traeger |

\* cited by examiner

BLOWER ASSEMBLY FOR GAS-BURNING APPLIANCE

CROSS-REFERENCE TO RELATED APPLICATION

This application claims priority to U.S. Provisional Patent Application Ser. No. 62/813,394 filed Mar. 4, 2019 for BLOWER ASSEMBLY FOR GAS-BURNING APPLIANCE, which is hereby incorporated by reference in its entirety.

BACKGROUND

The field of the disclosure relates generally to blower assemblies for gas-burning appliances, and more specifically to a blower assembly including a two piece housing.

Known gas-burning appliances require sufficient airflow to exhaust, and to reduce the concentration of, dangerous combustion gas by-products, such as, for example, CO (carbon monoxide), $NO_3$, and $NO_4$, among others. In some known high efficiency furnaces, water heaters, and other gas-burning appliances, standard chimney air-draw effects are not sufficient to assure the required airflow through the gas burners and heat exchangers, and therefore, some known gas-burning appliances utilize draft inducers to provide sufficient airflow through the heat exchangers of the furnace and to reduce the concentration of combustion by-products. The generated airflow is typically drawn in from ambient or through an inlet duct by a blower, and typically exhausted through an exhaust duct. Blowers installed in gas-burning appliances are typically selected to operate at a sufficient speed and volume to generate the necessary airflow for efficient heat transfer within the appliance and to exhaust combustion gases with an acceptable by-product concentration.

BRIEF DESCRIPTION

In one aspect, a blower assembly for a gas-burning appliance is provided. The blower assembly includes a blower and a motor coupled to the blower and configured to turn the blower to provide airflow through the gas-burning appliance. The blower assembly also includes a housing enclosing the blower and the motor. The housing includes a first portion and a second portion coupled to the first portion. The first portion and the second portion define a cavity therebetween to receive the motor and the blower. The blower assembly further includes an inlet sleeve coupled between the first portion and the second portion. The inlet sleeve is configured to couple to the gas-burning appliance and receive the airflow from the gas-burning appliance. The blower assembly also includes a seal extending at least partially around the inlet sleeve and at least partially between the inlet sleeve and at least one of the first portion and the second portion.

In another aspect, a gas-burning appliance is provided. The gas-burning appliance includes an inlet to receive airflow into the gas-burning appliance and a burner configured to carry out combustion of the airflow and a fuel. The gas-burning appliance also includes a heat exchanger configured to receive airflow from the burner and facilitate transfer of heat from combustion gases in the airflow to a medium. The gas-burning appliance includes a vent duct configured to receive airflow from the heat exchanger. The gas-burning appliance also includes a blower assembly including a blower and a motor coupled to the blower and configured to turn the blower to provide the airflow through the gas-burning appliance. The blower assembly also includes a housing enclosing the blower and the motor. The housing includes a first portion and a second portion configured to couple to the first portion. The first portion and the second portion define a cavity therebetween to receive the motor and the blower. The blower assembly also includes an inlet sleeve coupled between the first portion and the second portion of the housing. The inlet sleeve is configured to couple to the vent duct and receive the airflow from the vent duct.

In yet another aspect, a. method of assembling a blower assembly for a gas-burning appliance is provided. The method includes coupling a housing first portion to a housing second portion. The housing first portion and the housing second portion define a cavity therebetween to receive a motor and a blower. The motor is configured to turn the blower to provide airflow through the gas-burning appliance. The method also includes coupling an inlet sleeve between the housing first portion and the housing second portion. The inlet sleeve is configured to receive the airflow from the gas-burning appliance. The method further includes positioning a seal at least partially around the inlet sleeve and at least partially between the inlet sleeve and at least one of the housing first portion and the housing second portion.

DETAILED DESCRIPTION

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Gas-burning appliances, such as, for example, and without limitation, furnaces and water heaters, burn a mixture of air and a fuel to generate heat that is carried by combustion gasses. The combustion gasses are typically drawn through a heat exchanger by a blower, and then vented out through an exhaust duct. While flowing through the heat exchanger, the combustion gasses heat another medium, such as, for example, water. If the airflow is too little, combustion gasses are inadequately evacuated from the gas-burning appliance and dangerous CO gas can result. If the airflow is too great, combustion gasses are properly vented, but the combustion and heat exchange become less efficient due to excess air being pulled through the burner.

Embodiments of the present disclosure provide a blower assembly for gas-burning appliances. More specifically, embodiments of the blower assembly described herein include a fan, a motor connected to the fan to turn the fan, and housing enclosing the blower and the motor. The housing is assembled using a two-piece construction and includes a first portion and a second portion. The first portion is coupled to the second portion such that the first portion and the second portion define a cavity to receive a motor and a blower. In addition, an inlet sleeve is coupled between the first portion and the second portion and is configured to couple to a vent duct of the gas-burning appliance for receiving combustion gases from the gas-burning appliance. The inlet sleeve may be formed separately from the first portion and the second portion or may be integrally formed with one of the first portion and the second portion. A seal extends around the inlet sleeve and at least partially between the inlet sleeve and at least one of the first portion and the second portion.

The blower assemblies described herein are less expensive to assemble than at least some known blower assemblies for gas-burning appliances. For example, embodiments of the blower assembly described herein include two portions that couple together to form the housing. An inlet sleeve is coupled between the two portions. As a result, the housing is simpler to assemble and requires less time to assemble and install than at least some known blower housings. In addition, the housing encloses both the fan and the motor and reduces the noise of the blower assembly during operation of the blower assembly.

The blower assemblies are more compact and provide a reduced profile that is simpler to install than prior systems. For example, the housing encloses all components of the blower assembly and reduces the total number of components of the blower assembly. Moreover, auxiliary systems such as a motor cooling system are incorporated into the blower assembly. As a result, the separate systems/components of the blower assembly can be constructed with less expensive components and do not require separate housings.

Figure 1:
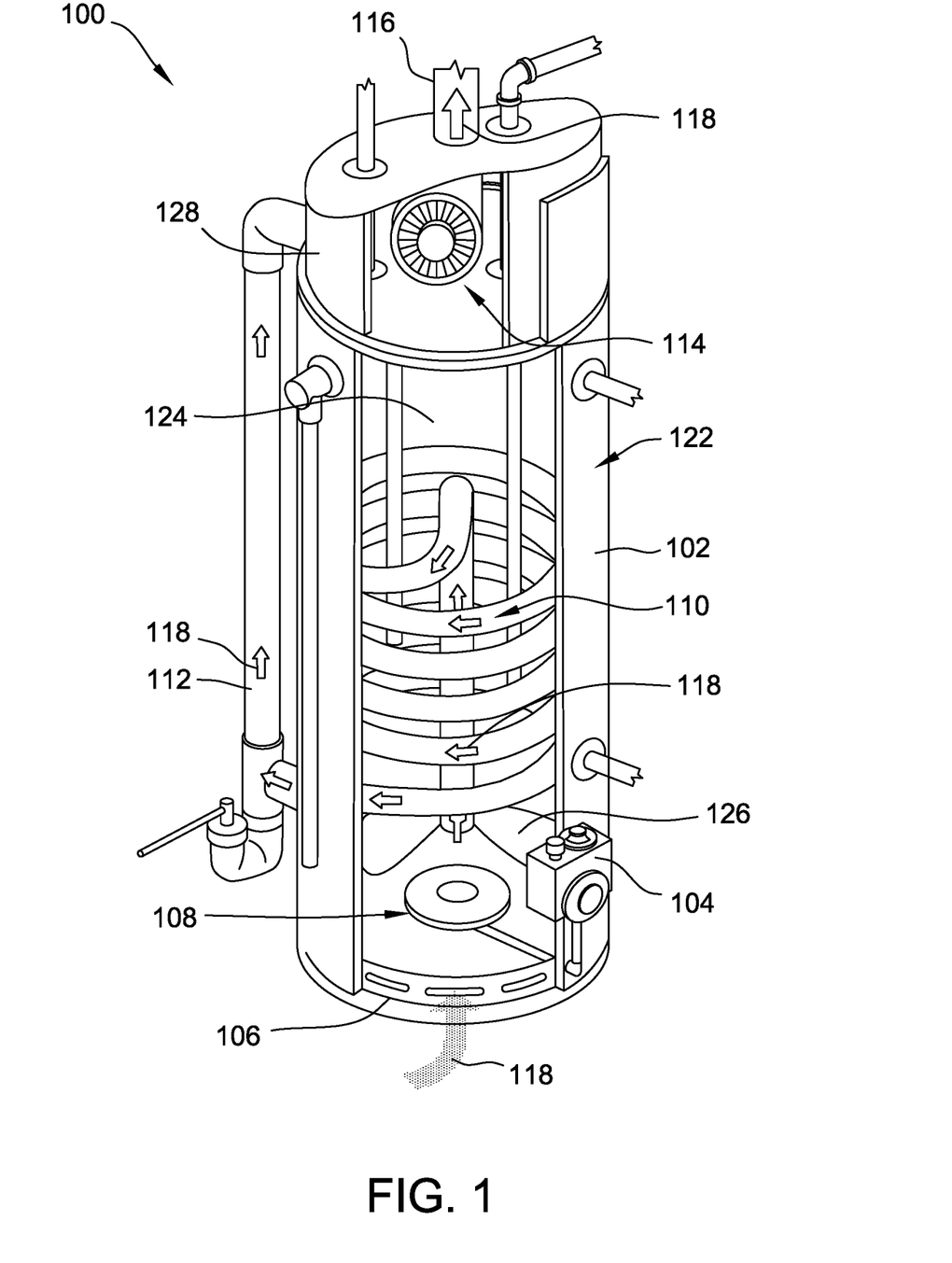
FIG. 1 is a partially schematic perspective view of an exemplary embodiment of a gas-burning appliance with a portion of an enclosure of the gas-burning appliance cut-away to illustrate interior components of the gas-burning appliance.

FIG. 1 is a partially schematic perspective view of an exemplary gas-burning appliance 100. Gas-burning appliance 100 includes a tank 102, a fuel supply 104, an inlet 106, a burner 108, a heat exchanger 110, a vent duct 112, a blower assembly 114, and an exhaust duct 116. Blower assembly 114 includes a blower 132 (shown in FIG. 3) and a motor 134 (shown in FIG. 3) for turning blower 132. Gas-burning appliance 100 may further include a control system to control components of gas-burning appliance 100 such as burner 108, fuel supply 104, and/or blower assembly 114. In alternative embodiments, gas-burning appliance 100 includes any components that enable gas-burning appliance 100 to operate as described herein.

An airflow 118 is drawn through gas-burning appliance 100 by blower assembly 114. Airflow 118 is drawn into gas-burning appliance 100 at inlet 106. Airflow 118 exits gas-burning appliance 100 at exhaust duct 116. Although blower assembly 114 is shown as positioned proximate exhaust duct 116, it is contemplated that blower assembly 114 may be located at any position along airflow 118. For example, blower assembly 114 may be located upstream of burner 108 such that blower assembly 114 pushes air through burner 108 rather than pulling air through burner 108, as is shown in FIG. 1.

Gas-burning appliance 100 includes an enclosure 122 within which certain components of gas-burning appliance 100 are disposed. Burner 108, heat exchanger 110, and blower assembly 114 are located within enclosure 122. Enclosure 122 includes tank 102 which defines an interior space 124. Tank 102 is configured to hold a medium such as water within interior space 124. Tank 102 may include an inlet and an outlet for the medium to flow into/out of tank 102. Heat exchanger 110 extends through interior space 124 and contacts the medium within interior space 124. Burner 108 is positioned below tank 102 within a lower enclosure portion 126 of enclosure 122. Lower enclosure portion 126 includes inlet 106. Blower assembly 114 is positioned within an upper enclosure portion 128 located above tank 102. In alternative embodiments, one or more of burner 108, heat exchanger 110, and blower assembly 114 may be located outside enclosure 122. For example, in some embodiments, upper enclosure portion 128 is omitted and blower assembly 114 is positioned outside enclosure 122.

Airflow 118 enters gas-burning appliance 100 at inlet 106. Airflow 118 is generated by the turning of impeller 140 (shown in FIG. 3) by motor 134 (shown in FIG. 3) to draw inlet airflow 118 into enclosure 122. Burner 108 carries out combustion of airflow 118 and a fuel provided by fuel supply 104, producing combustion gasses that include a proper amount of $CO_2$ and only trace amounts of CO. Combustion gasses pass through heat exchanger 110, where heat is transferred from the combustion gasses to another medium, such as, for example, and without limitation, water, within interior space 124 of tank 102. Airflow 118 carries the combustion gasses from heat exchanger 110, through vent duct 112, through blower assembly 114, and through exhaust duct 116. Combustion gasses in airflow 118 are vented from exhaust duct 116 out of gas-burning appliance 100.

Figure 2:
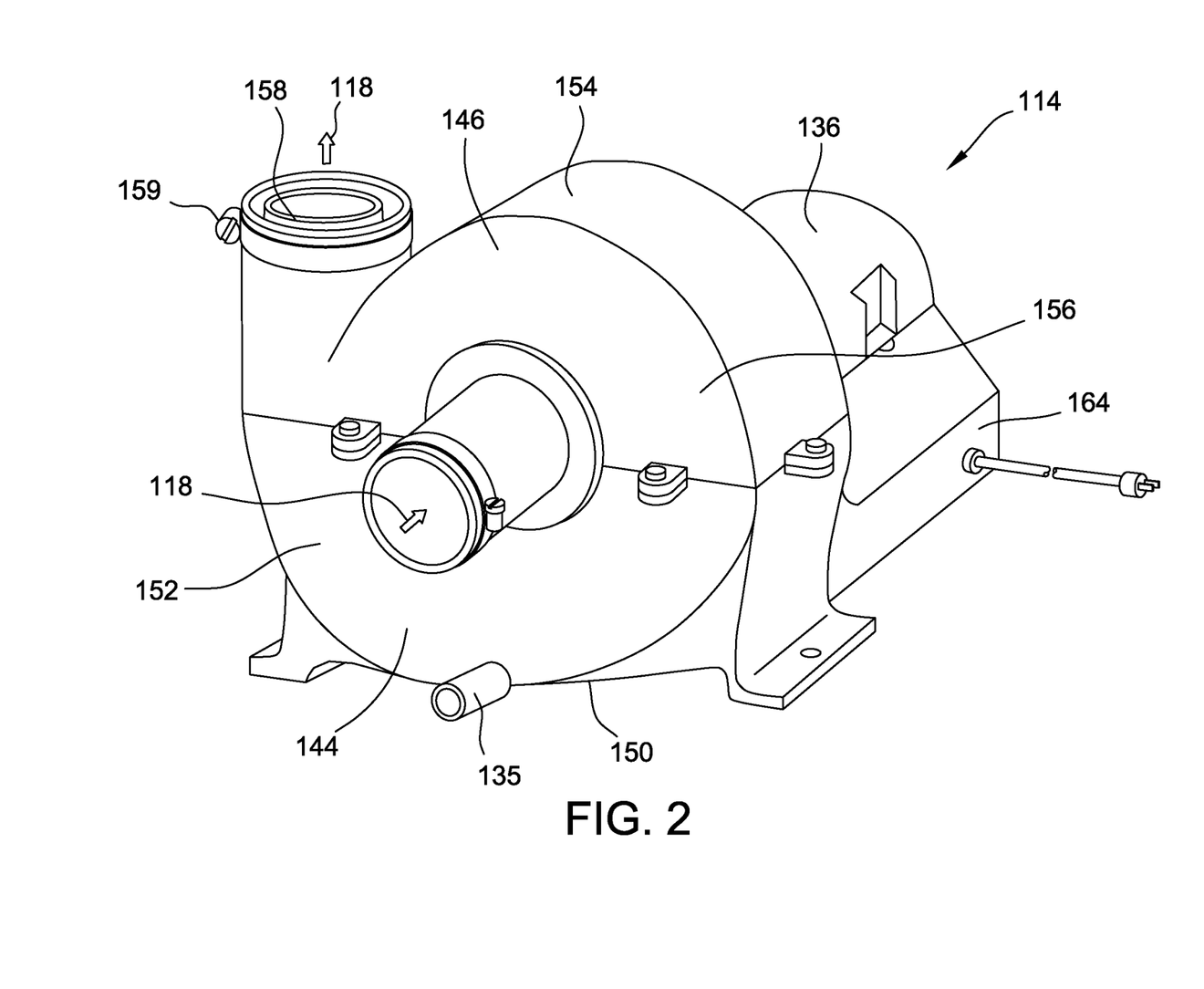
FIG. 2 is a perspective view of a blower assembly for use with the gas-burning appliance shown in FIG. 1.
Figure 3:
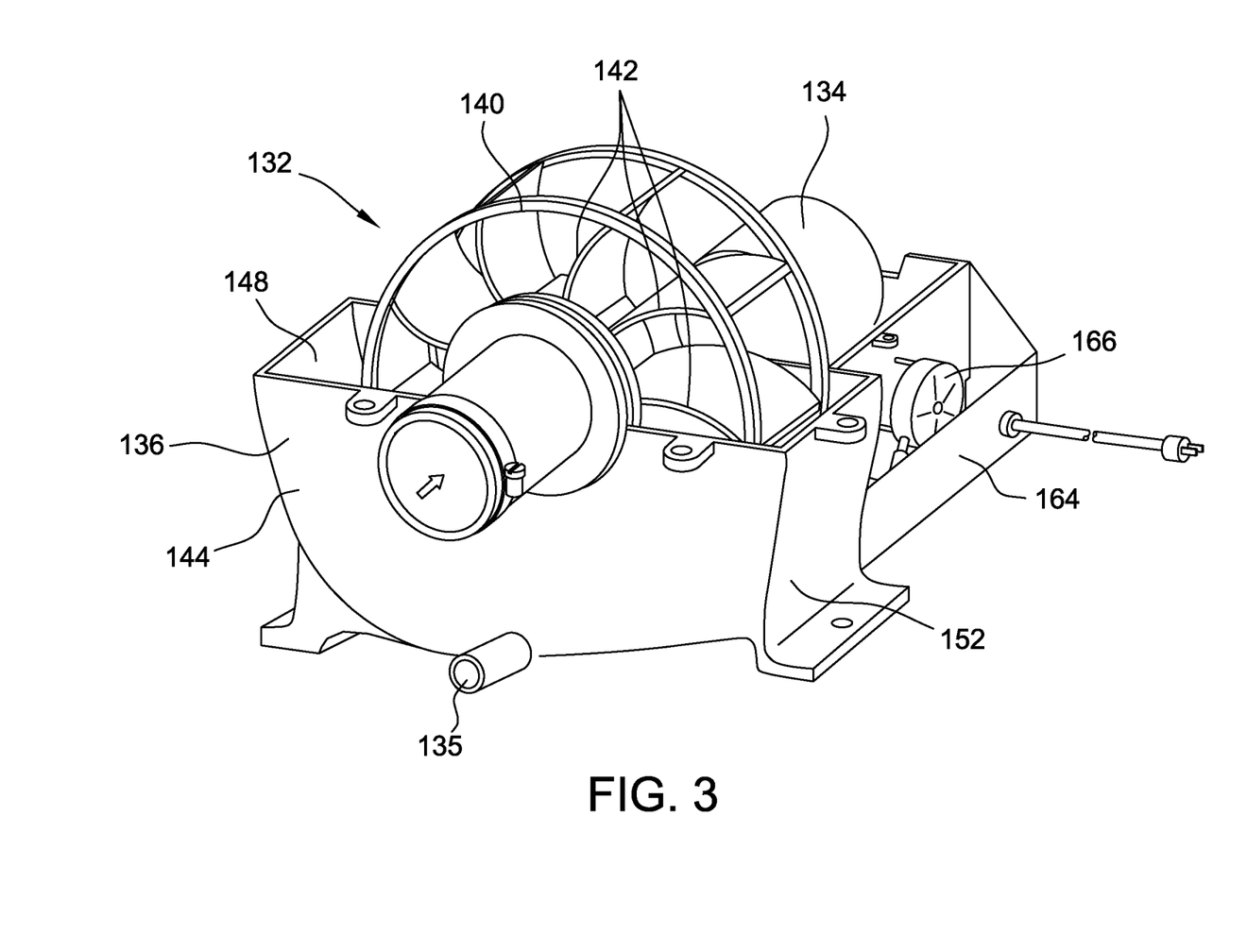
FIG. 3 is a perspective view of the blower assembly shown in FIG. 2 with a portion removed to show a blower and a motor.

FIG. 2 is a perspective view of blower assembly 114 for use with gas-burning appliance 100. FIG. 3 is a perspective view of blower assembly 114 with a portion removed to show blower 132 and motor 134. Blower assembly 114 includes a blower 132, a motor 134, and a housing 136. In the exemplary embodiment, blower 132 includes an impeller 140 including a plurality of radially extending, curved vanes 142. Motor 134 is coupled to blower 132 by a shaft 138 (shown in FIG. 4) and is configured to turn impeller 140 to provide airflow 118 through gas-burning appliance 100 (shown in FIG. 1). In alternative embodiments, blower assembly 114 includes any blower 132 that enables blower assembly 114 to operate as described herein.

In the exemplary embodiment, motor 134 rotates shaft 138 to cause rotation of impeller 140. Motor 134 may be any motor that enables blower assembly 114 to operate as described herein. Accordingly, housing 136 is modular and configured to receive different types of motors because of the construction of housing 136 described herein. For example and without limitation, housing 136 is configured to receive C-frame motors, shaded pole motors, permanent split capacitor (PSC) motors, and electronically commutated motors (ECM).

Also, in the exemplary embodiment, housing 136 encloses blower 132 and motor 134. Housing 136 includes a first portion 144 and a second portion 146. Housing 136 has a clamshell configuration and is assembled by coupling first portion 144 to second portion 146, which collectively form the entire body of housing 136. As a result, the time required to assemble housing 136 is reduced in comparison to housings that require three or more parts to enclose a motor or blower. Moreover, housing 136 may be constructed using less expensive materials and methods than at least some known housings. Also, housing 136 may be assembled and installed at the installation site relatively quickly and without the use of specialized tools or parts.

In addition, in the exemplary embodiment, first portion 144 and second portion 146 define a cavity 148 therebetween to receive motor 134 and blower 132. Also, first portion 144 and second portion 146 may include saddles or other features to support and align first portion 144 and second portion 146. First portion 144 and second portion 146 completely enclose motor 134 and blower 132 when motor 134 and blower 132 are positioned within cavity 148. Accordingly, blower 132 and motor 134 are enclosed as an assembly in the same housing and can be installed as a single assembly. In addition, housing 136 reduces the noise generated by blower assembly 114 during operation of motor 134 and blower 132. Also, housing 136 includes one or more condensate drains 135 to allow condensation to be removed from the interior of housing 136.

Also, in the exemplary embodiment, housing 136 has a height, width, and length that define a volume of housing 136. Housing 136 is compact, i.e., has a volume that is less than at least some known systems, and is sized to simplify installation of blower assembly 114. For example, in some embodiments, housing 136 has a height in a range of about 4 inches (in.) to about 18 in., a width in a range of about 6 in. to about 18 in., and a length in a range of about 6 in. to about 24 in. In the exemplary embodiment, housing 136 has a height of approximately 9 in., a width of approximately 14 in., and a length of approximately 9.5 in. In alternative embodiments, housing 136 is any size that enables blower assembly 114 to operate as described herein.

Moreover, in the exemplary embodiment, first portion 144 includes a bottom 150 and a first wall 152 extending upward from bottom 150 in reference to the orientation shown in FIGS. 2 and 3. Second portion 146 includes a top 154 and a second wall 156 extending downward from top 154 in reference to the orientation shown in FIG. 2. First wall 152 and second wall 156 extend between top 154 and bottom 150 when first portion 144 is coupled to second portion 146 such that bottom 150, first wall 152, top 154, and second wall 156 collectively define cavity 148 when first portion 144 is coupled to second portion 146. First portion 144 is a single piece, i.e., bottom 150 and first wall 152 are integrally formed and permanently joined together. Also, second portion 146 is a single piece, i.e., top 154 and second wall 156 are integrally formed and permanently joined together. Accordingly, housing 136 has a two-piece construction. Each of first portion 144 and second portion 146 form roughly half, e.g., an upper half and a lower half, of housing 136. In alternative embodiments, housing 136 includes any portions 144, 146 that enable housing 136 to function as described herein. For example, in some embodiments, one of first portion 144 or second portion 146 defines more than half of housing 136 and the other defines less than half of housing 136.

Moreover, in the exemplary embodiment, at least one of first portion 144 and second portion 146 defines an outlet 158 for airflow 118 to exit cavity 148. In the exemplary embodiment, outlet 158 is defined by second portion 146 and extends upward from cavity 148, in reference to the orientation shown in FIG. 2, to allow airflow 118 to flow to exhaust duct 116 (shown in FIG. 1) positioned above blower assembly 114. In some embodiments, outlet 158 includes a condensate trap to collect condensation as airflow flows through outlet 158 and into exhaust duct 116. Outlet 158 may be coupled to exhaust duct 116 by a clamp 159 and/or other fastening devices. In alternative embodiments, blower assembly 114 includes any outlet 158 that enables blower assembly 114 to operate as described herein.

Figure 4:
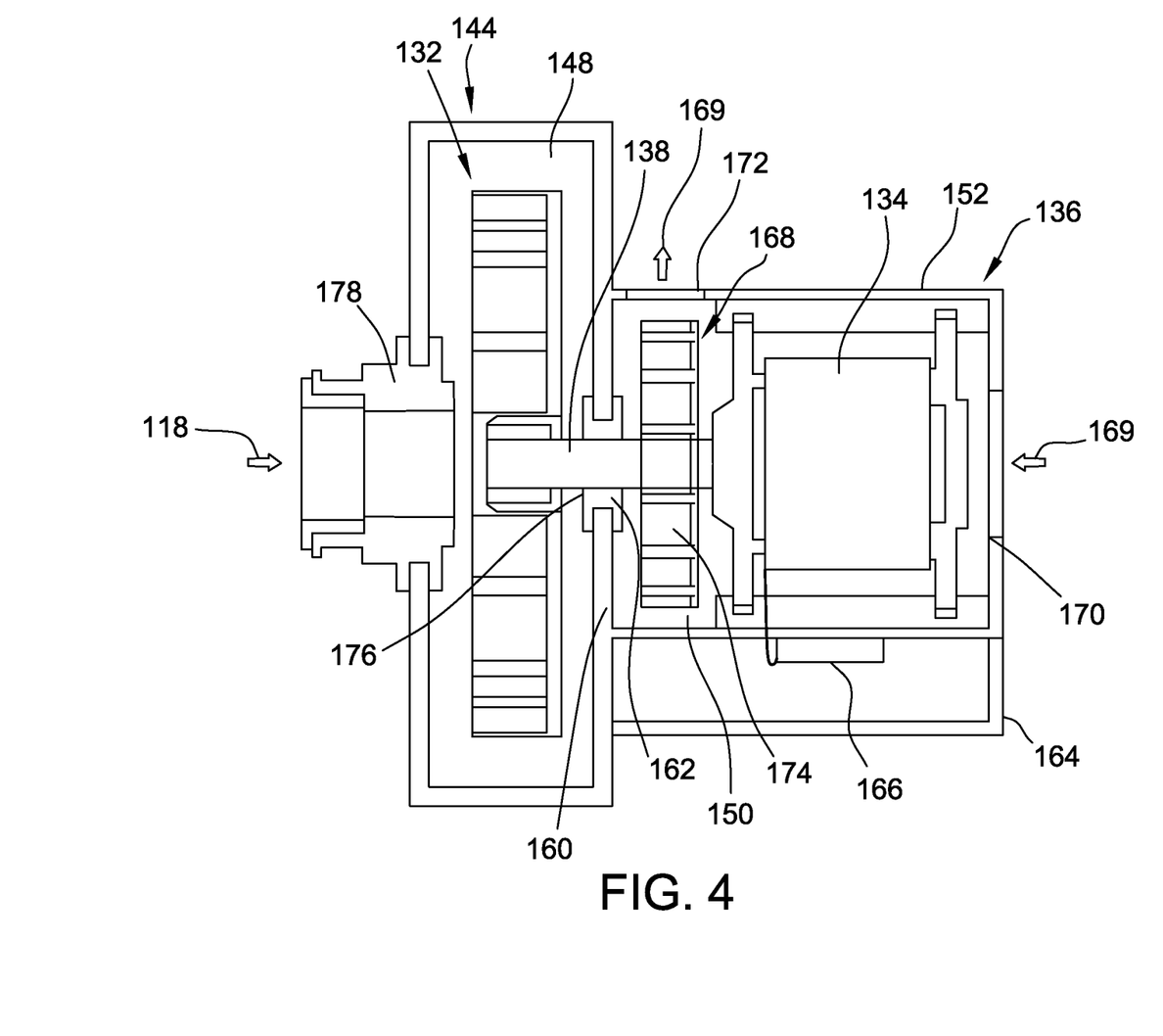
FIG. 4 is a top view of the blower assembly shown in FIG. 3.

FIG. 4 is a top view of blower assembly 114 with first portion 144 (shown in FIG. 2) removed. At least one of first portion 144 and second portion 146 includes a divider 160 separating motor 134 and blower 132 when blower 132 and motor 134 are positioned within cavity 148. Accordingly, divider 160 separates cavity 148 into a motor cavity portion and a blower cavity portion. Housing 136 is sized and shaped to receive motor 134 and blower 132 within the respective cavity portion. Divider 160 is sealed to maintain separate airflows for blower 132 and motor 134.

In the exemplary embodiment, divider 160 is defined by first portion 144 and second portion 146 (shown in FIG. 2). Specifically, divider 160 has a lower portion integrally formed with first wall 152 and an upper portion integrally formed with second wall 156 (shown in FIG. 2). Divider 160 extends between bottom 150 and top 154 (shown in FIG. 2) and across a width of cavity 148 when first portion 144 is coupled to second portion 146. Divider 160 defines an opening 162 for shaft 138 to extend through. A shaft seal 176 is disposed at least partially within opening 162 and extends around shaft 138 to seal opening 162. In the exemplary embodiment, shaft seal 176 extends around the entire circumference of shaft 138 and between shaft 138 and first portion 144 and second portion 146. Blower assembly 114 may include one or more bearings (not shown) to rotatably support shaft 138. Accordingly, shaft 138 is able to extend between and drivingly couple motor 134 to blower 132 when motor 134 and blower 132 are positioned on opposite sides of divider 160. In alternative embodiments, housing 136 includes any divider 160 that enables blower assembly 114 to operate as described herein. In some embodiments, divider 160 is omitted.

Also, in the exemplary embodiment, blower assembly 114 includes a controller compartment 164 defined by housing 136. A vacuum switch 166 is positioned within controller compartment 164 and is configured to control motor 134 and to provide a safety circuit. Controller compartment 164 may include a removable or positionable cover to provide access to vacuum switch 166 and other components within controller compartment 164. Vacuum switch 166 may be included in the control system for gas-burning appliance 100 (shown in FIG. 1) or may be a standalone system. In alternative embodiments, blower assembly 114 includes any controller that enables blower assembly 114 to operate as described herein.

Moreover, in the exemplary embodiment, blower assembly 114 includes a cooling system 168 configured to draw cooling airflow 169 through housing 136. Housing 136 defines an intake 170 and an exhaust 172. A fan 174 is positioned in cavity 148 of housing 136 and is configured to generate cooling airflow 169 from intake 170 to exhaust 172. Fan 174 is coupled to motor 134 and rotated when the shaft of motor 134 rotates. In alternative embodiments, blower assembly 114 includes any cooling system 168 that enables blower assembly 114 to operate as described herein. For example, in some embodiments, cooling system 168 includes a heat sink, a heat exchanger, and/or any other suitable cooling feature.

Figure 5:
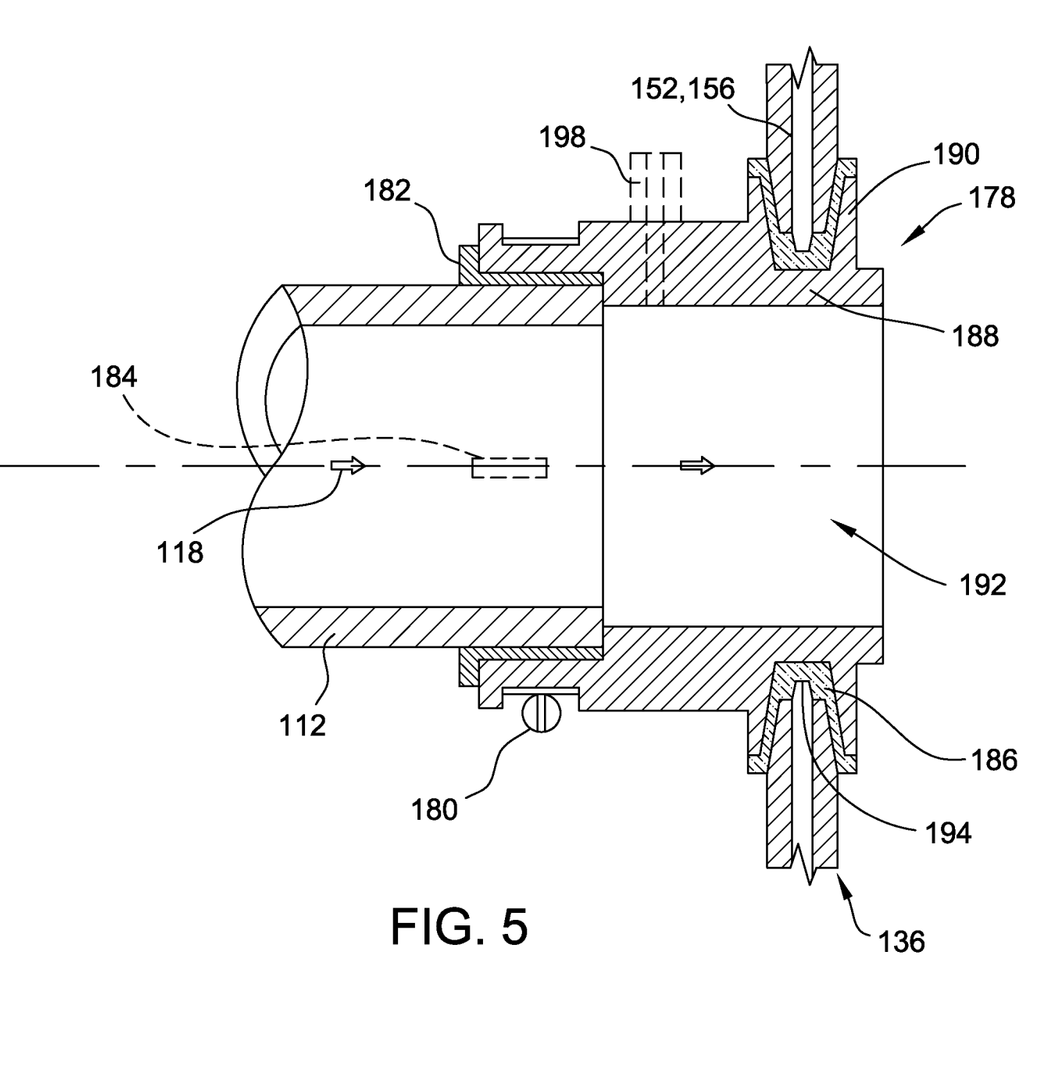
FIG. 5 is an enlarged sectional view of an inlet sleeve of the blower assembly shown in FIGS. 2-4.
Figure 6:
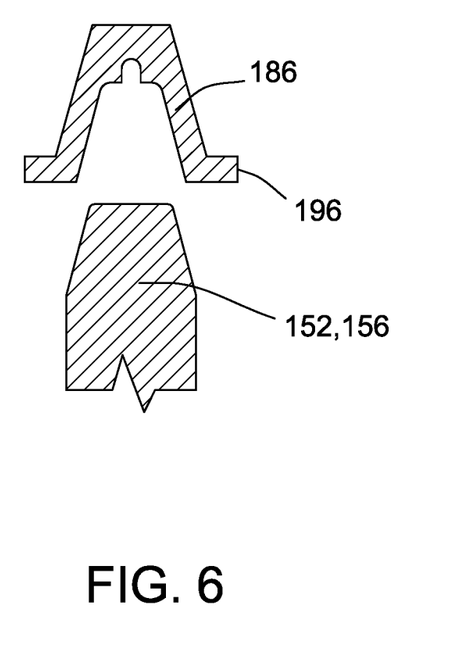
FIG. 6 is an enlarged sectional assembly view of a portion of a seal of the blower assembly shown in FIG. 2.

FIG. 5 is an enlarged sectional view of an inlet sleeve 178 of blower assembly 114 (shown in FIGS. 2-4). FIG. 6 is an enlarged sectional assembly view of a portion of a seal 186 of blower assembly 114 (shown in FIGS. 2-4). In the exemplary embodiment, inlet sleeve 178 is coupled between wall 152 of first portion 144 and wall 156 of second portion 146 of housing 136. Inlet sleeve 178 extends into cavity 148 adjacent blower 132 (shown in FIGS. 2 and 3) to allow airflow 118 to enter cavity 148 (shown in FIGS. 3 and 4).

In addition, in the exemplary embodiment, inlet sleeve 178 is configured to couple to gas-burning appliance 100 (shown in FIG. 1) and receive airflow 118 from vent duct 112 of gas-burning appliance 100. For example, inlet sleeve 178 extends on an exterior of housing 136 and is sized and shaped to receive vent duct 112 therein. In some embodiments, a clamp 180 or other fastener is used to couple vent duct 112 to inlet sleeve 178. Inlet sleeve 178 may include a groove and lip configured to receive and retain clamp 180 in position. In some embodiments, a gasket or rubber sleeve 182 is positioned between inlet sleeve and vent duct 112. In further embodiments, inlet sleeve 178 includes one or more features to facilitate engagement of inlet sleeve 178 and vent duct 112 such as grooves or slots 184 which allow for compression of inlet sleeve 178. In alternative embodiments, inlet sleeve 178 is coupled to vent duct 112 in any manner that enables blower assembly 114 to operate as described herein.

Also, in the exemplary embodiment, inlet sleeve 178 is a separate piece from first portion 144 and second portion 146 (shown in FIG. 2). In alternative embodiments, blower assembly 114 includes any inlet sleeve 178 that enables blower assembly 114 to operate as described herein. For example, in some embodiments, inlet sleeve 178 is integrally formed with at least one of first portion 144 and second portion 146. In further embodiments, portions of inlet sleeve 178 are formed on each of first portion 144 and second portion 146 and coupled together when first portion 144 and second portion 146 are coupled together.

In addition, in the exemplary embodiment, blower assembly 114 includes a seal 186 extending around at least a portion of inlet sleeve 178 and between inlet sleeve 178 and at least one of first portion 144 and second portion 146. In the exemplary embodiment, inlet sleeve 178 is a separate piece from both first portion 144 and second portion 146 and seal 186 extends around the entire perimeter of inlet sleeve 178 and between inlet sleeve 178 and both first portion 144 and second portion 146. In alternative embodiments, inlet sleeve 178 is integrally formed with first portion 144 or second portion 146 and seal 186 does not extend between inlet sleeve 178 and the respective portion.

Moreover, in the exemplary embodiment, inlet sleeve 178 includes a tubular body 188 and a collar 190 extending around and radially outward from tubular body 188. Tubular body 188 defines a passageway 192 for airflow 118 to flow through inlet sleeve 178. Collar 190 defines a channel 194 to receive walls 152, 156 of first portion 144 and second portion 146 and couple inlet sleeve 178 to walls 152, 156 when inlet sleeve 178 is positioned between first portion 144 and second portion 146.

As shown in FIG. 6, seal 186 is an overmold and is configured to be disposed at least partially within channel 194 (shown in FIG. 5). Seal 186 is substantially U-shaped and includes lips 196 that extend over an edge of collar 190. Seal 186 is shaped to receive walls 152, 156 and may include one or more notches or other features that correspond to the shapes of walls 152, 156. In addition, seal 186 has a width that is slightly less than the thickness of walls 152, 156 to provide an interference fit when walls 152, 156 are received within channel 194.

Also, in the exemplary embodiment, seal 186 is an elastic material such as rubber. In alternative embodiments, blower assembly 114 includes any seal 186 that enables blower assembly 114 to operate as described herein.

In some embodiments, inlet sleeve 178 includes an optional pressure tap 198 to allow regulation of the pressure of fluid flowing through inlet sleeve 178. Pressure tap 198 may be coupled to and extend through tubular body 188. In further embodiments, blower assembly 114 may include any suitable valve and/or pressure regulator. In alternative embodiments, pressure tap 198 is omitted.

Referring to FIGS. 1-5, a method of assembling blower assembly 114 for gas-burning appliance 100 includes coupling first portion 144 to second portion 146 such that first portion 144 and second portion 146 define cavity 148 therebetween to receive motor 134 and blower 132. Motor 134 and blower 132 are positioned within cavity 148 and coupled together by shaft 138 extending through opening 162 in divider 160. Motor 134 and blower 132 are completely enclosed within housing 136 when first portion 144 and second portion 146 are coupled together. For example, first portion 144 and second portion 146 are coupled together by positioning opposing edges of first wall 152 and second wall 156 in contact with each other and securing first portion 144 and second portion 146 together. In the exemplary embodiment, first portion 144 and second portion 146 are fastened together using fasteners positioned in openings in first portion 144 and second portion 146. In alternative embodiments, first portion 144 and second portion 146 are coupled together in any manner that enables housing 136 to function as described herein.

The method also includes coupling inlet sleeve 178 between first portion 144 and second portion 146 and positioning seal 186 at least partially around inlet sleeve 178 and at least partially between inlet sleeve 178 and at least one of first portion 144 and second portion 146. For example, inlet sleeve 178 is positioned such that first wall 152 and second wall 156 are received in channel 194 of inlet sleeve 178. Seal 186 is positioned within channel 194 to contact and, thereby, seal inlet sleeve 178 and housing 136. First portion 144 and second portion 146 are coupled together with inlet sleeve 178 positioned therebetween.

In some embodiments, the method further includes coupling inlet sleeve 178 to vent duct 112 and coupling outlet 158 to exhaust duct 116. Accordingly, blower assembly 114 is arranged to induce airflow 118 through gas-burning appliance 100 and exhaust airflow 118 through exhaust duct 116. In the exemplary embodiment, blower assembly 114 is positioned on top of tank 102 and housing 136 is mounted to enclosure 122 above tank 102.

The methods and systems described herein provide several advantages and improvements over prior methods and systems. For example, the technical effect may include at least one of: (a) decreasing the cost to assemble the blower assembly; (b) reducing the noise generated during operation of the blower assembly; (c) ensuring proper ventilation of combustion gasses from the gas-burning appliance; (d) improving efficiency of combustion and heat transfer in the gas-burning appliance; and (e) simplifying selection, installation, and configuration of gas-burning appliances by providing a modular, cost effective blower assembly for gas-burning appliances.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A blower assembly for a gas-burning appliance, said blower assembly comprising:
   a blower;
   a motor coupled to said blower and configured to turn said blower to provide airflow through the gas-burning appliance;
   a housing enclosing said blower and said motor, said housing including:
      a first portion including a first wall; and
      a second portion coupled to said first portion and including a second wall, said first portion and said second portion defining a cavity therebetween to receive said motor and said blower;
   an inlet sleeve coupled between said first portion and said second portion, said inlet sleeve configured to couple to the gas-burning appliance and receive the airflow from the gas-burning appliance; and
   a seal extending at least partially around said inlet sleeve and at least partially between said inlet sleeve and both of said first portion and said second portion, wherein said seal is U-shaped and receives said first wall of said first portion and said second wall of said second portion.

2. The blower assembly of claim 1, wherein said inlet sleeve is a separate piece from said first portion and said second portion, said seal extending completely around a perimeter of said inlet sleeve and between said inlet sleeve and both of said first portion and said second portion.

3. The blower assembly of claim 1, wherein said inlet sleeve includes a tubular body and a collar extending around said tubular body, said collar defining a channel to receive walls of said first portion and said second portion.

4. The blower assembly of claim 3, wherein said seal comprises an overmold disposed at least partially within the channel of said collar.

5. The blower assembly of claim 1, wherein said first portion includes a bottom, wherein said first wall extends upward from said bottom and around the cavity, and wherein said second portion includes a top, wherein said second wall extends downward from the top and around the cavity.

6. The blower assembly of claim 5, wherein at least one of said first portion and said second portion further includes a divider separating the motor and the blower, said divider joined to at least one of said first wall and said second wall.

7. The blower assembly of claim 6 further comprising a shaft coupling said blower to said motor, wherein said divider defines an opening for said shaft to extend through.

8. The blower assembly of claim 1, wherein at least one of said first portion and said second portion defines an outlet configured to couple to an exhaust duct for airflow to exit said housing.

9. A gas-burning appliance comprising:
   an inlet to receive airflow into said gas-burning appliance;
   a burner configured to carry out combustion of the airflow and a fuel;
   a heat exchanger configured to receive airflow from said burner and facilitate transfer of heat from combustion gases in the airflow to a medium;
   a vent duct configured to receive airflow from said heat exchanger; and
   a blower assembly comprising:
      a blower;
      a motor coupled to said blower and configured to turn said blower to provide the airflow through said gas-burning appliance;
      a housing enclosing said blower and said motor, said housing including:
         a first portion including a first wall; and
         a second portion configured to couple to said first portion and including a second wall, said first portion and said second portion defining a cavity therebetween to receive said motor and said blower; and
      an inlet sleeve coupled between said first portion and said second portion of said housing, said inlet sleeve configured to couple to said vent duct and receive the airflow from said vent duct; and
      a seal extending at least partially around said inlet sleeve and at least partially between said inlet sleeve and both of said first portion and said second portion, wherein said seal is U-shaped and receives said first wall of said first portion and said second wall of said second portion.

10. The gas-burning appliance of claim 9 further comprising an enclosure, wherein said burner and said heat exchanger are positioned within said enclosure, said blower assembly coupled to said enclosure.

11. The gas-burning appliance of claim 9, wherein said inlet sleeve includes a tubular body configured to receive said vent duct therein and a collar extending around said tubular body, said collar defining a channel to receive walls of said first portion and said second portion.

12. The gas-burning appliance of claim 11 further comprising a gasket positioned between said inlet sleeve and said vent duct.

13. The gas-burning appliance of claim 11, wherein said inlet sleeve includes at least one feature to facilitate engagement of said inlet sleeve and said vent duct.

14. A method of assembling a blower assembly for a gas-burning appliance, said method comprising:
   coupling a housing first portion to a housing second portion, the housing first portion and the housing second portion defining a cavity therebetween to receive a motor and a blower, the motor configured to turn the blower to provide airflow through the gas-burning appliance;
   coupling an inlet sleeve between the housing first portion and the housing second portion, the inlet sleeve configured to receive airflow from the gas-burning appliance; and
   positioning a seal at least partially around the inlet sleeve and at least partially between the inlet sleeve and both of the housing first portion and the housing second portion, wherein the seal is U-shaped and receives a first wall of the housing first portion and a second wall of the housing second portion.

15. The method of claim 14, wherein the inlet sleeve includes a tubular body and a collar extending around the tubular body, the method further comprising positioning at least one wall of at least one of the housing first portion and the housing second portion into a channel defined by the collar.

16. The method of claim 14 further comprising coupling a shaft to the blower and to the motor, wherein at least one of the housing first portion and the housing second portion includes a divider separating the motor and the blower and defining an opening for the shaft to extend through.

17. The method of claim 14 further comprising coupling the inlet sleeve to a vent duct to facilitate airflow from the vent duct to flow into the cavity.

18. The method of claim 17 further comprising coupling an outlet defined by at least one of the housing first portion and the housing second portion to an exhaust duct for the airflow to exit the cavity.

\* \* \* \* \*